(12) United States Patent
Murarescu et al.

(10) Patent No.: US 7,698,870 B2
(45) Date of Patent: Apr. 20, 2010

(54) SUPPORT FRAME INCLUDING LONGITUDINAL AND TRANSVERSE BEAMS AND METHOD FOR PRODUCING THE FRAME

(75) Inventors: Viktor-Marius Murarescu, Friedrichshafen (DE); Björn Engles, Eckernförde (DE); Andreas Hopt, Friedrichshafen (DE); Matthias Schuchardt, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 1136 days.

(21) Appl. No.: 11/198,979

(22) Filed: Aug. 8, 2005

(65) Prior Publication Data

US 2005/0263669 A1 Dec. 1, 2005

Related U.S. Application Data

(63) Continuation-in-part of application No. PCT/EP2004/003506, filed on Apr. 2, 2004.

(51) Int. Cl.
*E04H 12/00* (2006.01)
(52) U.S. Cl. .................. 52/653.1; 52/167.7; 52/638; 52/650.2
(58) Field of Classification Search .......... 248/544, 248/580, 583, 614, 615, 632, 635, 637, 638, 248/672, 674, 676–679; 52/167.7, 167.8, 52/2.11, 638, 650.2; 410/46; 181/207; 417/363
See application file for complete search history.

(56) References Cited

U.S. PATENT DOCUMENTS

| | | | | |
|---|---|---|---|---|
| 1,477,331 | A * | 12/1923 | Ely | 248/544 |
| 2,064,751 | A * | 12/1936 | Hussman | 248/544 |
| 2,225,093 | A * | 12/1940 | Avery | 248/615 |
| 2,259,214 | A | 10/1941 | Rosenzweig | |
| 2,357,120 | A | 8/1944 | Kuebert et al. | |
| 2,399,414 | A * | 4/1946 | Wells et al. | 248/635 |
| 2,441,509 | A * | 5/1948 | Robinson | 248/634 |
| 2,634,069 | A * | 4/1953 | Drake et al. | 248/583 |
| 3,469,809 | A * | 9/1969 | Reznick et al. | 248/562 |
| 4,074,474 | A * | 2/1978 | Cristy | 52/2.11 |
| 4,317,556 | A * | 3/1982 | Dietrich, III | 248/602 |
| 4,598,503 | A * | 7/1986 | Berger et al. | 52/27 |

FOREIGN PATENT DOCUMENTS

| | | |
|---|---|---|
| DE | 43 15 694 | 11/1994 |
| FR | 1 380 351 | 10/1964 |

* cited by examiner

*Primary Examiner*—Basil Katcheves
(74) *Attorney, Agent, or Firm*—Klaus J. Bach

(57) ABSTRACT

In a frame consisting of longitudinal and transverse frame members which are used as bearing units, a frame bearing mount for the frame and an aggregate bearing mount are vertically arranged one upon the other and the frame areas between the frame bearing mounts and the aggregate bearing mounts are made of a vibration absorbing material in the form of blocks so as to provide a lightweight frame in a simple and economical manner and ensure an efficient attenuation of vibrations.

12 Claims, 2 Drawing Sheets

SUPPORT FRAME INCLUDING LONGITUDINAL AND TRANSVERSE BEAMS AND METHOD FOR PRODUCING THE FRAME

This is a Continuation-In-Part Application of International Application PCT/EP2004/003506 filed Apr. 2, 2004 and claiming the priority of German application 103 16 029.9 filed Apr. 7, 2003.

BACKGROUND OF THE INVENTION

It is known to support aggregates such as internal combustion engines on a frame consisting of longitudinal and transverse frame members in order to reduce the introduction of vibrations, particularly sound waves, into a foundation.

Such a frame is disclosed for example in DE 43 15 694 A1. The frame disclosed in this patent consists of longitudinal and transverse frame members and is supported on rubber pads which are arranged at the four corner points of the frame. On the frame, a sound generating machine, particularly a centrifuge, is supported. For the vibrational uncoupling of the machine from the frame, between the mounting means of the aggregate bearing and the base frame separating gaps are provided which are filled with a sound attenuating pressure resistant material, that is, a concrete or mineral casting which is intended to essentially prevent the transmission of sound waves to the profiled frame members. In a further development, the profiled frame members are filled with the sound attenuating material at least in the mounting areas of the aggregate bearings so that parts of the mounting means is disposed within the sound attenuating material. It is particularly proposed to fill the hollow profiled frame members over their full length with the sound attenuating material. Consequently, for an effective sound attenuation, with this design and support arrangement, a substantial amount of sound attenuating material appears to be needed for an effective sound attenuation. Further, it does not appear to be possible to adapt the support frame system to changing conditions without extensive changes of the basic design. In addition, the manufacture is expensive since chambers must be provided in the frame for the filling with the sound attenuating material. The manufacture of this frame however is also complicated and expensive because, for the manufacture of the separating gaps, the heavy and bulky frame members must be repositioned in an expensive procedure.

It is the object of the present invention to provide a frame which effectively attenuates or absorbs the transmission of vibrations particularly sound vibrations but which, at the same time, can be manufactured in a simple and relatively inexpensive way and which, in the manufacture thereof, can be easily and variably adapted to different loads without departing from the basic design principle.

SUMMARY OF THE INVENTION

In a frame consisting of longitudinal and transverse frame members which are used as bearing units, a frame bearing mount for the frame and an aggregate bearing mount are vertically arranged one upon the other and the frame areas between the frame bearing mounts and the aggregate bearing mounts are made of a vibration absorbing material in the form of blocks so as to provide a lightweight frame in a simple and economical manner and ensure an efficient attenuation of vibrations.

With this arrangement, the high-frequency vibrations reaching the sound attenuating material via the aggregate support structure on the way to the frame support structure are effectively absorbed by the internal attenuation of the sound damping material. The block of sound attenuating material represents a relatively large mass which is arranged exactly where it is needed that is in the area where the vibrations are introduced. In this way, the low and high-frequency vibrations can be optimally attenuated with only a relatively small amount of sound absorbing material. Furthermore, with this arrangement of the support or bearing structures the stresses on the frame are substantially reduced: Because of the vertical arrangement of the aggregate bearings and the frame bearings on top of one another, the dynamic and static forces occurring during operation are introduced directly into the foundation without being conducted through the frame members. The frame members can therefore be relatively small and lightweight.

The provision of noise vibration absorbing material in the form of blocks disposed between frame and aggregate support bearings has, in addition to functional advantages with respect to vibration damping, also advantages with regard to manufacturing techniques. Cost savings are achieved logistically by standardizing and the use of pre-assembled elements. The frame may also be adapted easily to different types and models of motors, generators and transmissions. Standard profile frame members only have to be adapted in size and position without deviating from the standard design principle. The calculation of the frame with regard to its strength, open frequencies and acoustic properties is simplified by the standard design. And it is also considered to be important that parts of the frame can easily be recycled since the various parts of different material can be easily and cleanly separated. Since only few areas of the frame are filled with polymer concrete attachment structures for elements to be supported on the frame, auxiliary equipment such as ducts etc. . . . can be connected to the frame in large areas by welding. Expensive bolt connections are therefore not needed.

The required vibration attenuation can be adapted in a simple manner during manufacture variably by suitable dimensioning of the blocks of sound absorbing material without departing from the principle on which the frame design is based. Preferably, the aggregate bearings are disposed on the blocks of sound absorbing material without coming into contact with the frame.

In a particular embodiment, the blocks are formed by casting the block material around areas of the frame particularly the intersecting points of the longitudinal and transverse frame members.

For the accommodation of the blocks hollow profiled elements may be used into which the sound absorbing material is filled. These hollow profiled elements are components which are disposed on the frame vertically and which can be located at various locations as needed without changing the frame. The hollow profiled elements may be formed from extruded profiled strands or from a casting. The hollow profiled elements are preferably inserted into sections of the frame or arranged between frame parts. The latter arrangement has the advantage that larger masses can be established. The hollow profiled elements can be connected to the frame by welding or by bolting. If they are attached by welding care must be taken by suitable design features that a high heat input into any polymer concrete as avoided.

The hollow profiled elements should be provided for example with suitable flanges so that hollow profiled elements can be welded to the frame remote from the body of the hollow profiled elements. However, welding methods may be used in combination with suitable cooling procedures capable of limiting the heat transfer. Of course, the hollow profiled elements could be welded to the frame before the introduction of the polymer concrete, although this results in disadvantages in the assembly. The surface of the block of sound absorbing material may also be provided at the side of the aggregate bearing with a spacer plate which extends beyond the hollow profiled element without coming into contact with it.

An important advantage of the manufacturing method in connection with the use of hollow profiled members resides in the fact that the noise absorbing material can be filled into the hollow profiled elements before the hollow profiled members are attached to the frame. As already mentioned, the handling during assembly is simplified because the blocks can then be manufactured and filled with the sound absorbing material without the completed frame being present and the need for handling the frame.

A particular embodiment of the invention is shown in, and described below with reference to, the accompanying drawings.

DESCRIPTION OF A PREFERRED EMBODIMENT

Figure 1:
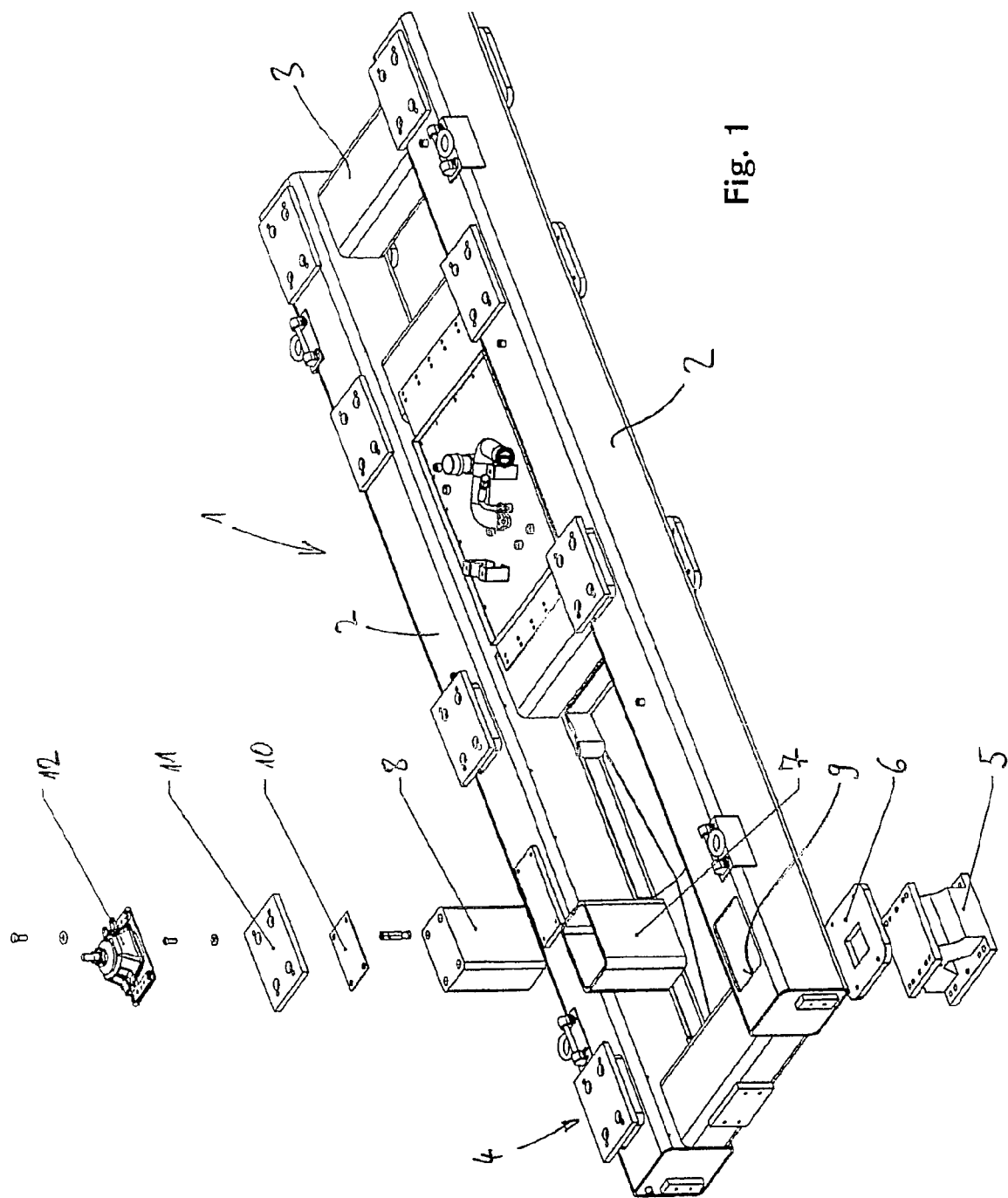
FIG. 1 is a perspective view of a frame with a bearing block shown in an exploded view.

The frame 1 shown in FIG. 1 comprises two longitudinal frame members 2 and several transverse frame members 3. For supporting an aggregate which is not shown such as an internal combustion engine with an electric generator, there are eight bearing blocks 4 which are disposed on the longitudinal frame members 2. The components of a bearing block 4 are shown in an exploded view. The frame 1 is supported on a foundation (not shown) by frame bearings 5. The frame bearings 5 consist of plates between which elastic rubber elements are disposed. The frame bearings 5 are bolted to the longitudinal frame members by way of an intermediate plate 6. The longitudinal frame members 2 have frame cutouts 9 for the accommodation of hollow profile elements 7. The hollow profile elements are filled with reaction resin concrete which is disposed in the form of blocks 8 in the hollow profile elements 7. Preferably, the hollow profile elements 7 are filled with the reaction resin cast before they are inserted into the frame cutouts 9 since in this way the handling during construction is facilitated.

However, if the hollow profile members are attached to the frame 1 by welding, measures must be provided for preventing an excessive heating of the reaction resin. This can be achieved preferably by design features by which heat removal is accomplished and/or the weld location is removed from the hollow profile elements 7. To this end, the hollow profile elements 7 may be provided with flanges 13 (see FIG. 2), which are welded to the frame 1. The hollow profile elements 7 must be rigidly connected to the frame 1 in order to prevent any movement of the frame members relative to the bearings. The hollow profile elements 7, which are rigidly connected to the frame members compensate for the weakening of the frame by the cutouts 9. The bearings 12 are connected by way of a plate 11 and a spacer plate 10 to the block 8, for example, by threaded anchors. The dimensions of the spacer plate 10 are so selected that no contact with the walls of the hollow profile element is established and the spacer plate 10 extends beyond the upper edge of the hollow profile element 7. In this way, it is ensured that the plate 11 which carries the aggregate bearing is not in contact with the metal of the hollow profile element 7.

Figure 2:
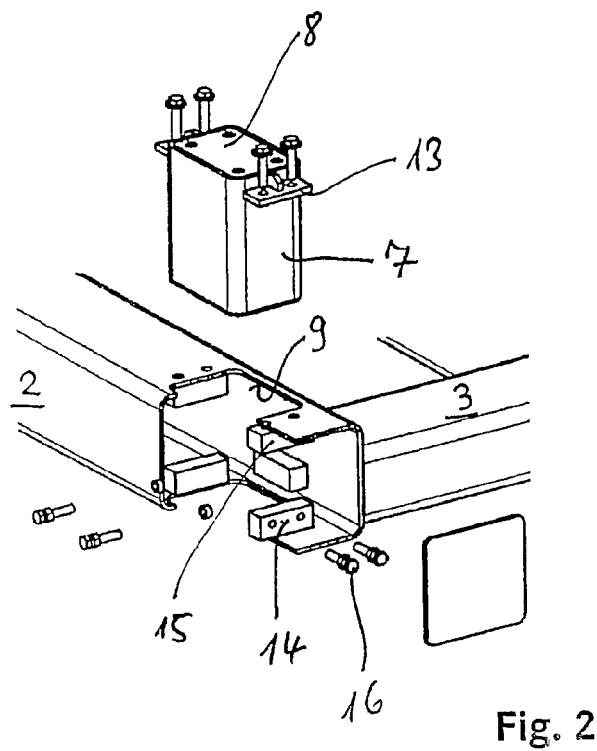
FIG. 2 is an exploded view of a bolted mounting for the bearing block.

FIG. 2 shows an arrangement of mounting means by which the hollow profile element 7 can be mounted in the frame cut-out 9 without welding that is by bolting. Attachment by bolts has the advantage that no heat is applied as it would if the hollow profile element 7 would be attached by welding so that the installation of the hollow profile element which is filled with reaction resin poses no problems. The hollow profile elements 7 are attached to the frame 1 via flanges 13 and webs 15. The webs 15 which are welded to the longitudinal frame members 2 form supports for screws a bolts 16 threaded into the frame and the webs 15. The hollow profile members 7 which fit into the frame cut-outs with some play are firmly engaged by way of the bolts 16 when the bolts 16 are tightened.

Figure 3:
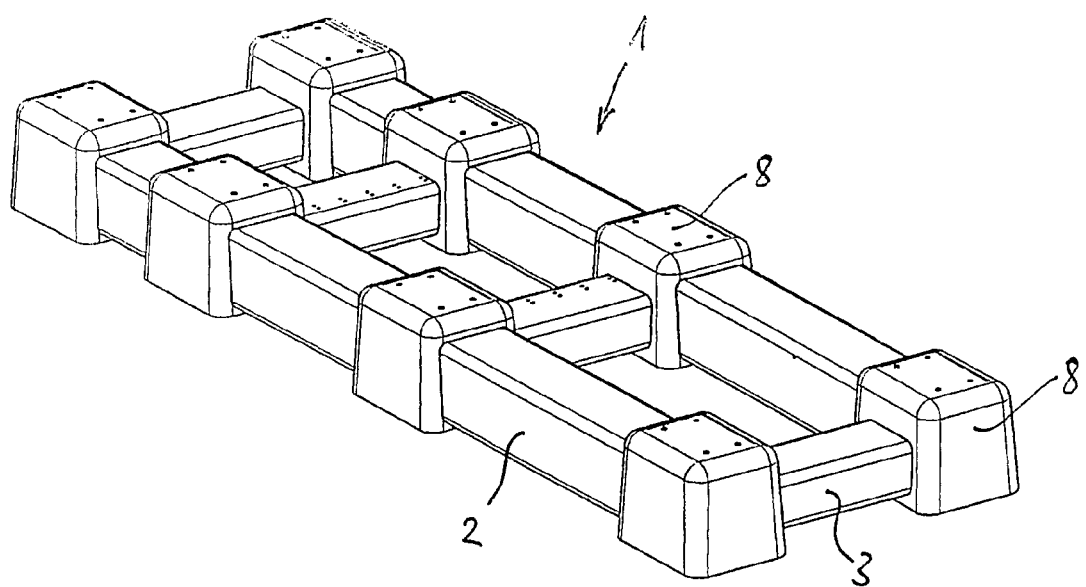
FIG. 3 is a perspective view of a frame wherein the blocks are formed by casting sound absorbing material around areas of the frame.

FIG. 3 is a perspective representation of another embodiment of the frame 1 according to the invention. In this embodiment, the blocks 8 of sound absorbing material are formed by casting the material around the intersection areas between the longitudinal and the transverse frame members 2, 3. To this end, casting molds are arranged at the intersections of the frame members and polymer concrete is introduced into the molds. After removal of the molds, the aggregate bearings 12 and the frame bearings 5 can be bolted into the polymer concrete without metal-to metal contact. This construction has the advantage that substantially higher masses can be provided in the area of the bearings blocks which effectively improves the sound absorbing properties of the frame 1.

In all embodiments presented herein, the aggregate Bearings 12 are disposed vertically above the frame bearings 5. As a result of the direct transfer of the forces resulting from the masses formed by the hollow profile elements 7 filled with reaction resin concrete or, respectively, the frame intersection areas cast into reaction resin concrete, the generation of transverse vibrations in the frame 1 is essentially avoided. The body sound transmission is therefore eliminated as the transmission of vibrations occurs exclusively via the material filled into the hollow profile elements 7 or cast around the frame member intersections, which material has a high internal attenuation capability when compared with steel. There is no direct steel-to-steel contact between the upper and lower bearing planes. The necessary damping can be adapted to the given conditions in a simple manner by changing the height of the blocks 8 of sound absorbing material which can be done in a simple manner without changing the frame members. In particular, also the masses of the hollow profile members 7 of steel and of the blocks 8 can be adjusted in a large range depending on the mass forces expected.

With the embodiment of the frame according to the invention substantial savings in weight are obtained. Also cost advantages are obtained by a simplified manufacturing method. A particularly simple manufacturing method is obtained if the hollow profile elements 7 are filled with a polymer concrete before they are mounted to the frame 1. Then, instead of the complete frame, only the hollow profile elements 7 need to be transported and handled for the filling with polymer concrete.

Advantageous is also the use of a construction kit principle wherein certain parts are standardized. The frame members can easily be adjusted by length and positions to different motor, generator, and transmission configurations without any change in the basic design concept.

What is claimed is:

1. A support frame (1) for supporting an aggregate, said support frame (1) including longitudinal and transverse intersecting support frame members (2,3), which are joined at the intersections, with open areas (9) extending vertically through the support frame members (2,3) at their intersections, and frame support bearings (5) which are arranged at the intersections and on which the support frame members (2,3) are supported, blocks (8) of vibration-absorbing support material disposed on the support bearings (5) and extending through the frame open areas (9) formed at the intersections of the frame members (2,3), and aggregate bearings (12) disposed on the blocks (8) on top of the support frame members without coming into vibration-transmitting contact with the support frame members (2,3) for supporting the aggregate directly on the frame support bearings (5) via the blocks (8) of vibration-absorbing support material.

2. A support frame according to claim 1, wherein the height of the blocks (8) of sound absorbing material is selected according to attenuation required.

3. A support frame according to claim 2, wherein the aggregate bearing is attached to the block (8) of sound absorbing material without direct contact with the frame (1).

4. A support frame according to claim 1, wherein the sound absorbing material is cast into hollow profile elements (7) of metal which are vertically disposed integrated into the frame (1).

5. A support frame according to claim 4, wherein the hollow profile elements (7) are formed from extruded strand profiles.

6. A support frame according to claim 4, wherein the hollow profile elements (7) are castings.

7. A support frame according to claim 4, wherein the hollow profile elements (7) are disposed in cutouts (9) of the frame (1).

8. A support frame according to claim 4, wherein the hollow profile elements (7) are disposed between frame members abutting the sides of the hollow profile elements. (7).

9. A support frame according to claim 4, wherein the hollow profile elements (7) are connected to the frame (1) by welding.

10. A support frame according to claim 4, wherein the hollow profile elements (7) are bolted to the frame (1)

11. A support frame according to claim 4, wherein the surface of the block (8) which consists of a sound absorbing material is provided at the top side thereof with a spacer plate (10) which extends vertically beyond the hollow profile element (7) without contacting it.

12. A support frame according to claim 4, wherein the sound absorbing material is introduced into the hollow profile elements (7) before the hollow profile elements (7) are connected to the frame (1).

* * * * *